A. R. SWANSON.
MEANS FOR SECURING TOOLS IN BORING BARS.
APPLICATION FILED SEPT. 12, 1918.
1,378,062.
Patented May 17, 1921.
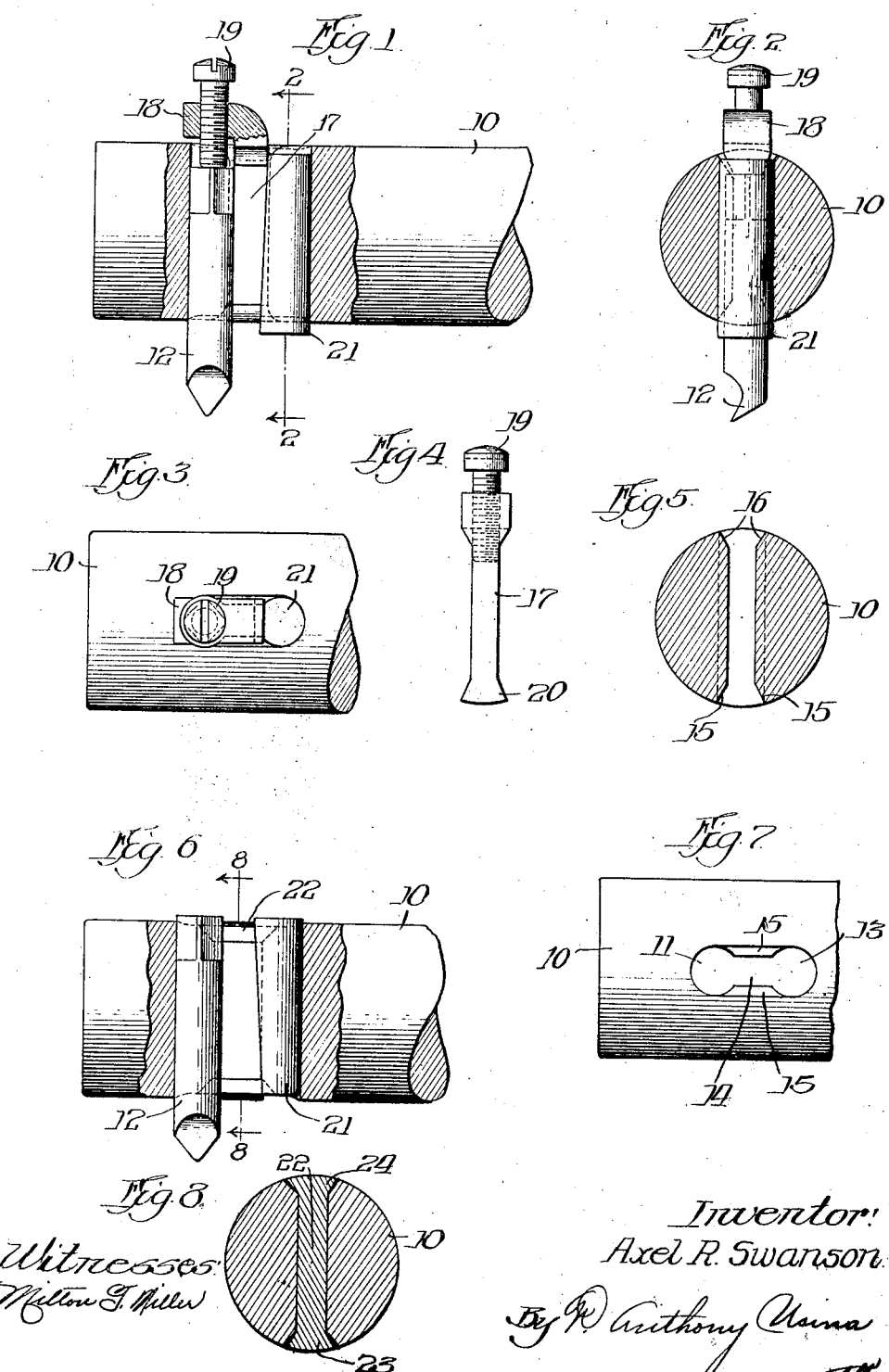
Inventor:
Axel R. Swanson

UNITED STATES PATENT OFFICE.

AXEL R. SWANSON, OF CHICAGO, ILLINOIS.

MEANS FOR SECURING TOOLS IN BORING-BARS.

1,378,062.   Specification of Letters Patent.   Patented May 17, 1921.

Application filed September 12, 1918. Serial No. 253,783.

*To all whom it may concern:*

Be it known that I, AXEL R. SWANSON, a citizen of the United States, residing at Chicago, in the county of Cook and State of Illinois, have invented certain new and useful Improvements in Means for Securing Tools in Boring-Bars, of which the following is a specification.

My invention relates to means for securing tools in boring bars of the type shown and described in my co-pending application, Serial No. 251,531, filed August 26, 1918, and has particular reference to means for securing a cutting tool in proper position in a boring bar and holding the cutting tool securely in any desired or adjusted position.

One object of my invention is the provision of means whereby the cutting tool may be easily adjusted in the boring bar so as to provide for the proper depth of cut in the work piece and for readjusting the cutting tool with each successive cut that is made through the metal.

Another object of my invention is the provision of means for holding the cutting tool securely, thus rendering the boring bar more safe in operation and which will not, under the strain of operating conditions, break and thereby perhaps injure the operator.

My invention will be further and better understood by reference to the accompanying drawings in which—

Figure 1 is a side elevation, parts being in section, of my improved device;

Fig. 2 is a vertical sectional view on lines 2—2 of Fig. 1;

Fig. 3 is a top view of my device;

Fig. 4 is a view in end elevation of the gib which holds the cutting tool;

Fig. 5 is a vertical sectional view showing the slot for the reception of the gib;

Fig. 6 is a view partially in section showing a slightly modified form of holding device;

Fig. 7 is a fragmentary plan view of the boring bar; and

Fig. 8 is a vertical sectional view on lines 8—8 of Fig. 6 and showing the modified form of gib.

Referring now specifically to the drawings, a boring bar 10 is shown having a transverse aperture including two associated parallel holes 11 and 13, preferably circular in section, one of said holes 11 being for the reception of a cutting tool 12, and the other for the reception of a wedge-shaped member 21. A relatively narrow neck or slot 14 extends between and connects the holes 11 and 13. The boring bar is slightly beveled at the outside edges of the slot or neck 14 between the holes 11 and 13, thus producing a pair of shoulders 15, 15, and 16, 16, at each end of the slot 14 for the purposes hereinafter described. Fitted within the transverse slot 14 is a gib 17 having a lateral extension 18 at its upper end through which a screw 19 passes in threaded engagement with the said extension 18 and which is positioned over the cutting tool 12 for the purpose of adjusting the cutting tool 12. The member 17 has a head portion 20 at its lower end, the sides of the head 20 fitting against the shoulders 15, 15, or against the shoulders 16, 16, depending upon which way the gib 17 is inserted in the slot 14, thus serving to hold the gib 17 securely in position and preventing its being drawn through the slot 14. The gib 17 is tapered slightly in a longitudinal direction from its top downward so that a wedging action takes place between the gib 17 and the wedge member 21 which is fitted within the aperture with its inclined face against the gib 17, thus securely holding the gib in position and also holding the cutting tool 12 securely in the boring bar but allowing for a vertical movement of the cutting tool 12 under the force exerted by the screw 19:

Referring now to Fig. 6 wherein a slight modification of the device is shown, the cutting tool 12 is shown held in position by a tapered or wedge-shaped gib 22 without the extension 18 as shown on the tapered gib 17. The gib 22 has head portions 23 and 24 at each of its ends so as to prevent movement of the gib 22 longitudinally of the slot 14, the purpose of this particular construction being to facilitate adverse operating conditions, for example, where the boring bar is inserted in a covered or other opening which would be too small to allow the extension 18 and the screw 19 to pass into the opening, the boring bar being inserted and the cutting end of the tool 12 brought into contact with the work. This type of gib can be used for holding the tool securely in position, the tool 12 being adjusted by slight blow with a hammer or driven through the bar a slight distance to provide the tool making the proper depth of cut by means of a punch until the opening is large enough so the gib 17 can be used.

In assembling the device and holding the cutting tool 12 in position the cutting tool 12 is inserted into the hole 11, the gib 17 is inserted into the hole 13 and then slipped over into the slot 14 and the wedge shaped member 21 is thereupon inserted into the transversely extending hole 13 and lightly driven into place. It will be understood, of course, that the wedge member 21 should not be driven too tightly or movement of the cutting tool 12 will not be permitted or will be made too difficult, and yet the member 21 should be driven tightly enough to hold the cutting tool 12 securely. When the device is in proper position the screw 19 can be turned until its lower end is in contact with the upper end of the cutting tool 12 and the cutting tool can thus be adjusted to any desired depth of cut.

It also will be understood that the cutting tool 12 will fit into the transversely extending aperture 13 and the wedge-member 21 into the opening 11 so that their respective positions are reversed from the positions shown in the drawing and the gib turned around so that the extension 18 projects in a direction opposite to that shown if desired for any particular purpose in order to properly position the cutting tool 12 in the work being done. The round cutting tool 12 has a squared top to allow a wrench or other tool to grip the cutting tool so that it may be turned into proper position.

While I have described precisely the details of construction, I do not wish to be understood as limiting myself thereto, as I contemplate changes in form and the proportion of parts and the substitution of equivalents as circumstances may suggest or render expedient without departing from the spirit or scope of my invention as defined in the appended claims.

I claim:

1. In combination a tool holding bar having an opening with a plurality of portions connected by a restricted passageway, a tool mountable in one of said portions, a wedge member in another portion and means for adjusting said tool mounted in said restricted passageway.

2. In combination a boring bar having apertures therethrough, a cutting tool and a pair of oppositely disposed wedge members within said apertures and adapted to hold said cutting tool in position, one of said wedge members being secured against longitudinal movement.

3. In combination a boring bar having apertures therethrough, a cutting tool, a gib having a head in contact with the edge of one of the said apertures and a wedge member within one of the other of said apertures adapted to hold the gib securely against the cutting tool.

4. In combination a boring bar having a pair of apertures therethrough with a slot connecting the said apertures, a cutting tool mounted within one of said apertures, a gib having a head at one of its ends and an extension at its other end, a wedge member within one of said apertures and means connected with said extension for adjusting the cutting tool.

5. In combination a boring bar having a pair of apertures therethrough with a slot connecting the said apertures, a cutting tool mounted within one of said apertures, a gib having a head at one of its ends and an extension at its other end, a wedge member within one of said apertures and a screw in threaded engagement with said extension for adjusting the cutting tool.

6. In combination a boring bar having a pair of transverse apertures therethrough and having a slot connecting said apertures, a cutting tool mounted within one of said apertures, a gib having a head portion in contact with the edges of the transverse slot and having an extension on its opposite end and a screw through said extension whereby the cutting tool is adjusted.

7. In combination a boring bar having a pair of apertures therethrough and having a slot therein connecting said apertures, a cutting tool mounted within one of said apertures, and a pair of co-acting wedge members, one of said wedge members being mounted in the slot and the other in one of the apertures, adapted to secure said cutting tool in position, one of said wedge members being secured against longitudinal movement.

Signed at Chicago, Illinois, this 22nd day of August, 1918.

AXEL R. SWANSON.